United States Patent [19]

Ishii et al.

[11] Patent Number: 5,586,091
[45] Date of Patent: Dec. 17, 1996

[54] MAGNETOOPTICAL RECORDING APPARATUS INCLUDING A CONTROL CIRCUIT FOR DRIVING A SWITCH ELEMENT BETWEEN ON AND OFF STATES IN ACCORDANCE WITH AN ERROR DETECTION

[75] Inventors: Kazuyoshi Ishii, Tokyo; Makoto Hiramatsu, Kawasaki, both of Japan

[73] Assignee: Canon Kabushiki Kaisha, Tokyo, Japan

[21] Appl. No.: 262,988

[22] Filed: Jun. 21, 1994

[30] Foreign Application Priority Data

Jun. 23, 1993 [JP] Japan .................................... 5-176220

[51] Int. Cl.⁶ .............................. G11B 11/00; G11B 5/02
[52] U.S. Cl. ................... 369/13; 360/59; 360/114
[58] Field of Search ...................... 369/13, 146; 360/59, 360/114, 66, 67, 46, 68; 361/156, 143, 152

[56] References Cited

U.S. PATENT DOCUMENTS

| | | | |
|---|---|---|---|
| 5,220,467 | 6/1993 | Zucker | 360/66 |
| 5,377,055 | 12/1994 | Ishii | 360/59 |

FOREIGN PATENT DOCUMENTS

| | | |
|---|---|---|
| 0312143 | 4/1989 | European Pat. Off. . |
| 0399978 | 11/1990 | European Pat. Off. . |
| WO9010290 | 9/1990 | WIPO . |
| WO9201285 | 1/1992 | WIPO . |

OTHER PUBLICATIONS

Smedley, et al., "One–Cycle Control of Switching Converters," Power Electronics Group, Jun. 1991, pp. 888 through 896.
Patent Abstracts of Japan, Kokai No. 3-238602, vol. 16, No. 24, Jan. 1992.
Patent Abstracts of Japan, Kokai No. 3-198204, vol. 15, No. 466, Nov. 1991.
Patent Abstracts of Japan, Kokai No. 3-157839, vol. 15, No. 395, Oct. 1991.
Patent Abstracts of Japan, Kokai No. 3-130903, vol. 15, No. 347, Sep. 1991.

Primary Examiner—Ali Neyzari
Attorney, Agent, or Firm—Fitzpatrick, Cella, Harper & Scinto

[57] ABSTRACT

In a magnetooptical recording apparatus, a light beam is radiated onto a magnetooptical recording medium while applying a bias magnetic field to the recording medium in such a manner that at least one of the light beam and the bias magnetic field is modulated according to an information signal. A current to be supplied from a DC power supply to the bias magnetic field applying device is switched by a switch element. The current switched by the switch element is smoothed by a smoothing circuit. The current to be supplied from the DC power supply to the bias magnetic field device is detected by a current detection element. A ratio between ON and OFF time periods of the switch element is changed in correspondence with an error between a value detected by the current detection element and a pre-set reference value.

14 Claims, 5 Drawing Sheets

INPUT SIGNAL OF COMPARISON CKT 18

OUTPUT SIGNAL OF COMPARISON CKT 18

MAGNETOOPTICAL RECORDING APPARATUS INCLUDING A CONTROL CIRCUIT FOR DRIVING A SWITCH ELEMENT BETWEEN ON AND OFF STATES IN ACCORDANCE WITH AN ERROR DETECTION

BACKGROUND OF THE INVENTION

1. Field of the Invention

The present invention relates to a light intensity modulation or magnetic field modulation type magnetooptical recording apparatus and, more particularly, to improvements in drive devices for an electromagnet for generating erasing and recording bias magnetic fields in a light intensity modulation type apparatus, and for a magnetic head for generating a recording modulated magnetic field in a magnetic field modulation type apparatus.

2. Related Background Art

Conventionally, as typical magnetooptical recording methods for recording information on a magnetooptical recording medium, a light intensity modulation method and a magnetic field modulation method are known. The two recording methods will be briefly described below. FIG. 1 shows the schematic arrangement of a light intensity modulation type magnetooptical recording apparatus. Referring to FIG. 1, a recording layer 1a is formed on a magnetooptical disk 1 as an information recording medium. The disk 1 is rotated at a predetermined speed by a spindle motor 7. An electromagnet 2 as a magnetic field generator is arranged above the upper surface of the magnetooptical disk 1, and an optical head 5 is arranged below the lower surface of the disk 1 at a position opposite to the electromagnet 2. The electromagnet 2 is obtained by winding an excitation coil 2b around a magnetic core 2a, and generates a magnetic field for erasing or recording information when it is driven by an electromagnet drive circuit 3. The optical head 5 comprises a semiconductor laser 5a as a light source, an objective lens for converging a laser beam emitted from the laser 5a to a small beam spot, and radiating the beam spot on the recording layer 1a, and the like. The optical head 5 radiates a laser beam modulated according to an information signal onto the recording layer 1a when it is driven by a laser drive circuit 6.

When information is to be recorded, a control signal for instructing recording of information is supplied to the electromagnet drive circuit 3, and the electromagnet drive circuit 3 drives the electromagnet 2 on the basis of the instruction. Thus, a DC recording current is supplied to the excitation coil 2b of the electromagnet 2, and the electromagnet 2 generates a recording bias magnetic field in a predetermined direction and applies it to the magnetooptical disk 1. On the other hand, the laser drive circuit 6 generates a drive current modulated according to an input information signal, and drives the semiconductor laser 5a by the generated drive current. Thus, a laser beam from the semiconductor laser 5a is intensity-modulated in accordance with the information signal, and is radiated onto the recording layer 1a of the rotating magnetooptical disk 1. In this manner, the recording bias magnetic field and the modulated laser beam are applied to the recording layer 1a, and the direction of magnetization in a portion, irradiated with the laser beam, on the recording layer 1a aligns upward or downward in correspondence with the intensity of the laser beam. When the recording layer 1a is cooled upon rotation of the magnetooptical disk 1, the direction of magnetization is fixed, and an information mark corresponding to the information signal is recorded. Prior to this recording operation, an area to be recorded on the magnetooptical disk 1 is normally erased. When information is to be erased, the optical head 5 radiates a laser beam having a predetermined intensity onto the magnetooptical disk 1 while the electromagnet 2 applies an erasing bias magnetic field in a direction opposite to the recording bias magnetic field to the disk 1. Thus, the direction of magnetization of the recording layer 1 uniformly aligns, thereby erasing information.

FIG. 2 is a circuit diagram showing in detail the arrangement of the light intensity modulation type electromagnet drive circuit 3. Referring to FIG. 2, the excitation coil 2b of the electromagnet 2 is driven by transistors T1 to T4. FIG. 2 shows a bridge type drive circuit. The electromagnet drive circuit 3 includes a DC power supply V, a resistor R1 for setting the drive current of the excitation coil 2b to be a proper value, and an inverter 8 for inverting the information signal. The electromagnet drive circuit 3 receives a control signal from a controller (not shown), and drives the electromagnet 2 on the basis of the control signal. More specifically, when a low-level signal is input as the control signal, the transistors T1 and T4 are turned on, and the transistors T2 and T3 are turned off, thus supplying an erasing current to the excitation coil 2b in the direction of an arrow e in FIG. 2. On the other hand, when a high-level signal is input as the control signal, the transistors T1 and T4 are turned off, and the transistors T2 and T3 are turned on, thus supplying a recording current to the excitation coil 2b in the direction of an arrow w in FIG. 2. In this manner, in the electromagnet drive circuit 3, the electromagnet 2 is driven to generate an erasing or recording magnetic field by switching the direction of a current to be supplied to the excitation coil 2b in accordance with the control signal.

The magnetic field modulation method will be described below with reference to FIG. 3. Note that the same reference numerals in FIG. 3 denote the same parts as in FIG. 1, and a detailed description thereof will be omitted. Referring to FIG. 3, a magnetic head 9 generates a recording bias magnetic field. The magnetic head 9 is constituted by a magnetic core 9a, and an excitation coil 9b wound around the magnetic core 9a. When the direction of a current to be supplied to the excitation coil 9b is switched in correspondence with an information signal upon driving of a magnetic head drive circuit 10, the magnetic field generated by the magnetic head 9 is modulated in accordance with the information signal. On the other hand, a laser drive circuit 11 supplies a DC current to a semiconductor laser 5a, and the semiconductor laser 5a radiates a laser beam having a predetermined intensity onto a magnetooptical disk 1. Note that a control signal to be input to the laser drive circuit 11 is one for instructing switching of the laser beam from the semiconductor laser 5a between recording power and reproduction power in correspondence with recording and reproduction modes of information.

When information is to be recorded, the magnetic head drive circuit 10 supplies a drive current, which is modulated in accordance with an information signal, to the excitation coil 9b of the magnetic head 9. The magnetic head 9 generates a recording magnetic field modulated in accordance with the information signal, and applies the generated magnetic field to the magnetooptical disk 1. On the other hand, the semiconductor laser 5a in an optical head 5 receives a DC current from the laser drive circuit 11, and radiates a continuous laser beam onto the recording layer 1a. Upon radiation of the laser beam, the irradiated portion of the recording layer 1a is heated to a temperature equal to or higher than its Curie temperature, and the direction of magnetization in the irradiated portion of the recording layer 1a aligns in the direction of the bias magnetic field of the magnetic head 9. When the irradiated portion of the recording layer 1a is cooled upon rotation of the magnetooptical disk 1, the direction of magnetization in the irradiated portion of the recording layer 1a is fixed, and is recorded as an information mark in the direction of magnetization corresponding to the information signal. Note that the magnetic field modulation method does not require erasing prior to recording, unlike the light intensity modulation method, and new information can be overwritten on old information.

FIG. 4 is a circuit diagram showing an example of the magnetic head drive circuit 10 in the magnetic field modulation method. Referring to FIG. 4, the circuit 10 includes auxiliary coils L1 and L2, and transistors T5 and T6 used for switching the direction of a current to be supplied to the excitation coil 9b. The circuit 10 also includes a DC power supply V, a resistor R2 for setting the drive current of the excitation coil 9b to be a proper value, and an inverter 12 for inverting the information signal, and applying the inverted signal to the base terminal of the transistor T6. The drive current of the excitation coil 9b is modulated as follows in accordance with the information signal. When the information signal is at low level, the transistor T5 is turned off, and the transistor T6 is turned on, thus supplying a drive current to the excitation coil 9b in the direction of an arrow e in FIG. 4. When the information signal goes to high level, the transistor T6 is turned off, and the transistor T5 is turned on, thus supplying a drive current to the excitation coil 9b in the direction of an arrow w in FIG. 4. In this manner, the direction of the current to be supplied to the excitation coil 9b is switched in correspondence with the information signal, and the magnetic field generated by the magnetic head 9 is modulated according to the information signal. Note that since the inductances of the auxiliary coils L1 and L2 are sufficiently larger than that of the excitation coil 9b, the auxiliary coils L1 and L2 have constant current characteristics, thereby allowing high-speed inversion of the drive current of the excitation coil 9b.

In the electromagnetic drive circuit in the light intensity modulation method and the magnetic head drive circuit in the magnetic field modulation method, which have been described above with reference to FIGS. 2 and 4, a resistor or an element having a function equivalent to the resistor (e.g., a transistor) is arranged in the circuit so as to set the drive current of the electromagnet or the magnetic head to be a proper value. As for the resistor, for example, when a drive current having an amplitude I=0.4 A is to be supplied to the excitation coil 9b in the magnetic head drive circuit shown in FIG. 4, if the voltage of the DC power supply V is 5 V, and the sum total of the resistances r of the auxiliary coils, the excitation coil, and the transistors in the path of the drive current excluding the resistor R2 is r=5 Ω, the resistor R2 is required to have a resistance of 7.5 Ω. However, when the resistor is arranged in the electromagnet drive circuit of the light intensity modulation method or in the magnetic head drive circuit of the magnetic field modulation method, as described above, the following two problems are posed.

As one problem, when the resistor (or an element having a function equivalent thereto) is arranged in the drive circuit, the power loss in the circuit becomes very large upon the supply of a drive current. For example, in the magnetic head drive circuit shown in FIG. 4, when the resistor R2 is set to have a resistance of 7.5 Ω, and the drive current is set to be 0.4 A, as described above, the power loss across the resistor R2 becomes 1.2 W. The DC power supply V must supply a total electric power of 2 W including a power loss of 0.8 W consumed by other drive circuit elements. In this case, the power loss across the resistor R2 accounts for 60% of the power loss of the entire circuit. In recent years, a compact structure is required for an information recording/reproduction apparatus such as a magnetooptical recording/reproduction apparatus, and in order to satisfy such a requirement, high-density packaging of an electric circuit, and low power consumption must be realized. However, when the drive current is limited by a resistor or an equivalent element arranged in the drive circuit, the resistor or the like disturbs not only low power consumption of the drive circuit, but also high-density packaging due to heat generated by the element.

As the other problem, since the voltage of the DC power supply V of the drive circuit, and the resistance r of the drive current path in the drive circuit are not always constant, but vary depending on various factors such as a change in temperature, the drive current of the excitation coil in the electromagnet of the light intensity modulation method or in the magnetic head of the magnetic field modulation method varies. When the drive current of the electromagnet or the magnetic head varies, a bias magnetic field by the electromagnet or the magnetic head varies. For this reason, when the driven current varies in a direction to decrease, the bias magnetic field becomes too weak, thus causing a recording error.

SUMMARY OF THE INVENTION

The present invention has been made in consideration of the conventional problems, and has as its object to provide a magnetooptical recording apparatus, which can greatly save power consumption, and can prevent generation of a recording error caused by a weak bias magnetic field generated by the electromagnet or the magnetic head.

In order to achieve the above object, according to the present invention, there is provided a magnetooptical recording apparatus which comprises an optical head for radiating a light beam onto a magnetooptical recording medium, and bias magnetic field applying means for applying a bias magnetic field to the recording medium, and records information by modulating at least one of the light beam or the bias magnetic field in accordance with an information signal, and applying the modulated light beam or bias magnetic field, comprising a switch element for switching a current to be supplied from a DC power supply to the bias magnetic field applying means, a smoothing circuit for smoothing a current switched by the switch element, and a current detection element for detecting a current to be supplied from the DC power supply to the bias magnetic field applying means, wherein a ratio between ON and OFF time periods of the switch element is changed in correspondence with an error between a value detected by the current detection element and a pre-set reference value, thereby controlling the current to be supplied from the DC power supply to the bias magnetic field applying means to be a predetermined current.

Furthermore, the magnetooptical recording apparatus is characterized in that the smoothing circuit uses an excitation coil of an electromagnet of the bias magnetic field applying means as a current smoothing inductance element.

Moreover, the magnetooptical recording apparatus is characterized in that the smoothing circuit uses an auxiliary coil arranged in the bias magnetic field applying means as a current smoothing inductance element.

DETAILED DESCRIPTION OF THE PREFERRED EMBODIMENTS

Figure 5:
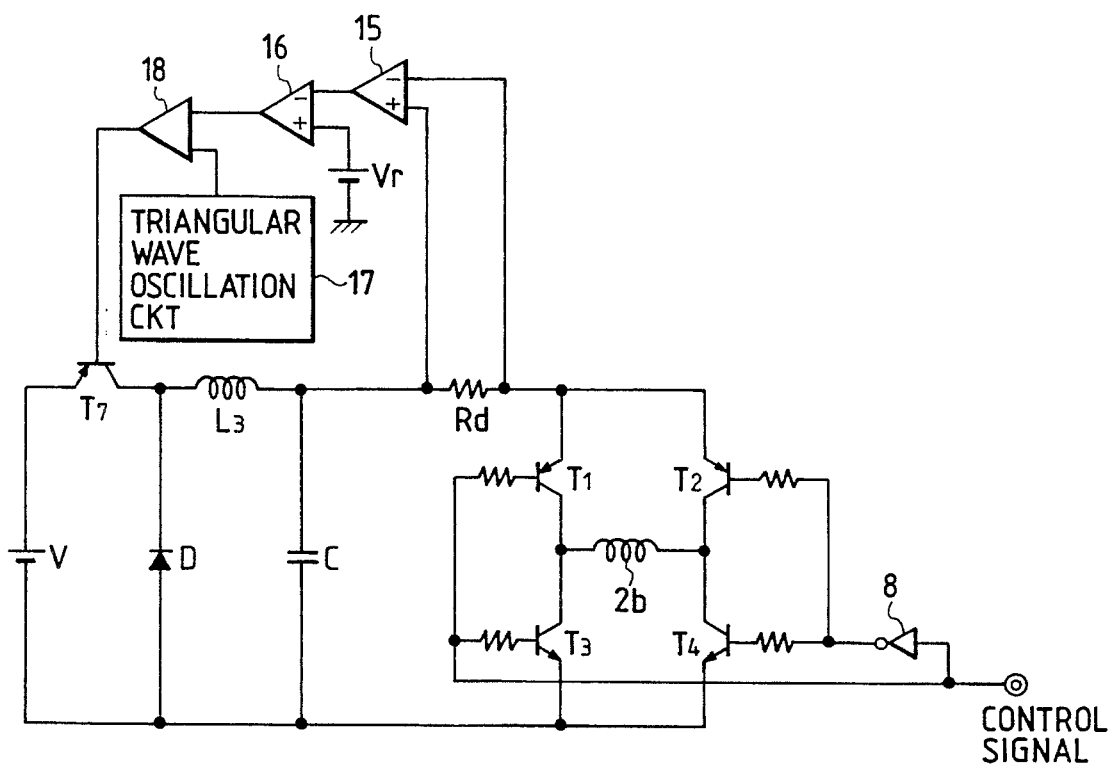
FIG. 5 is a circuit diagram showing the first embodiment of a magnetooptical recording apparatus according to the present invention.

The preferred embodiments of the present invention will be described in detail hereinafter with reference to the accompanying drawings. Since the schematic arrangement of a light intensity modulation type magnetooptical recording apparatus is the same as that shown in FIG. 1, the arrangement of an electromagnet drive circuit 3 will be described in detail below. FIG. 5 is a circuit diagram showing the first embodiment of the present invention. Note that FIG. 5 shows an embodiment wherein the present invention is applied to the light intensity modulation type magnetooptical recording apparatus shown in FIG. 1. Also, the same reference numerals in FIG. 5 denote the same parts as in the conventional apparatus shown in FIG. 2, and a detailed description thereof will be omitted. Referring to FIG. 5, a resistor Rd is arranged in a current supply path from a DC power supply V to the electromagnet drive circuit, and has a low resistance at which the power loss can be ignored. The resistor Rd is arranged as a drive current detection element for detecting the drive current to be supplied to the excitation coil 2b of the electromagnet 2 shown in FIG. 1. The drive current of the excitation coil 2b is detected as a voltage signal by detecting a voltage across the two terminals of the resistor Rd by a differential amplifier 15.

A differential amplifier 16 outputs the difference between the output voltage from the differential amplifier 15 and a reference voltage Vr output from a reference voltage generator (not shown). The reference voltage Vr is a voltage for setting the drive current to be supplied to the excitation coil 2b to be a proper value, and hence, the output voltage from the differential amplifier 16 indicates an error between the setting drive voltage and an actual drive voltage. A triangular wave oscillation circuit 17 generates a triangular wave signal having a predetermined frequency, and a comparison circuit 18 compares the triangular wave signal with the output signal from the differential amplifier 16 to generate a pulse signal. The level of the output signal from the differential amplifier 16 changes in correspondence with the error of the actual drive current from the setting reference current, as described above. When this signal is compared with the triangular wave signal having the predetermined frequency, a pulse signal, whose pulse width changes in correspondence with the change in level of the output signal from the differential amplifier 16, is output. More specifically, the pulse width of the pulse signal changes in correspondence with an error of the drive current, i.e., a so-called pulse width modulation is achieved.

A transistor T7 is arranged in a drive current supply path from the DC power supply V to the electromagnet drive circuit. The transistor T7 is turned on/off in response to a pulse signal from the comparison circuit 18, and the amount of current to be supplied from the DC power supply V to the electromagnet drive circuit is controlled by the switching operation of the transistor T7. Therefore, the comparison circuit 18 and the transistor T7 constitute a so-called chopper circuit. A coil L3 of an inductance element having constant current characteristics, a capacitor C, and a diode D constitute a smoothing circuit for smoothing the power supply current. Note that a control signal input to the electromagnet drive circuit is a signal for instructing erasing and recording modes, as described above. When the control signal is at low level, it instructs the erasing mode; when the control signal is at high level, it instructs the recording mode. Therefore, in the electromagnet drive circuit, the direction of a current to be supplied to the excitation coil 2b is switched by transistors T1 to T4 in correspondence with this control signal, thereby driving the electromagnet to generate an erasing or recording magnetic field.

Figure 6A:
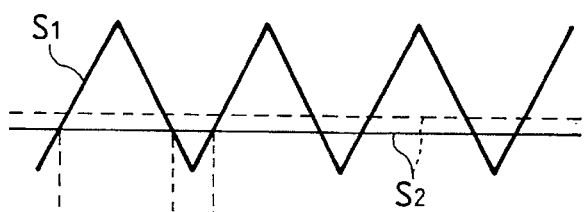
FIGS. 6A and 6B are signal waveform charts for explaining a current control operation of the embodiment shown in FIG. 5.
Figure 6B:
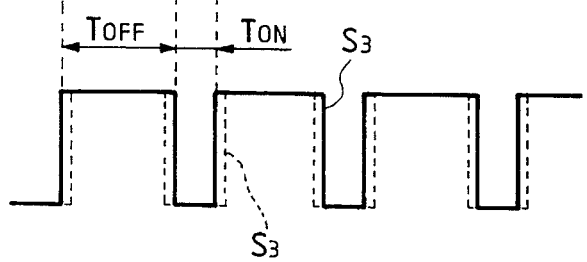

The detailed operation of this embodiment will be described below with reference to FIGS. 6A and 6B. FIG. 6A shows two signals to be input to the comparison circuit 18, i.e., a triangular wave signal S1 with a predetermined frequency output from the triangular wave oscillation circuit 17, and an output signal S2 from the differential amplifier 16. FIG. 6B shows a pulse signal with a predetermined frequency output from the comparison circuit 18. The output signal from the differential amplifier 16 is a signal whose level changes in correspondence with an error between the drive current supplied from the DC power supply V to the electromagnet drive circuit, and the setting drive current, and a signal S2 indicated by a broken line in FIG. 6A is an output signal obtained when the drive current is equal to a setting value, i.e., is proper. A signal S2 indicated by a solid line in FIG. 6A is an output signal obtained when the drive current becomes excessive to due some factor. The drive current is detected by the differential amplifier 15 as a potential difference across the resistor Rd, and the differential amplifier 16 compares this potential difference with the reference voltage Vr, thereby outputting a signal which increases/decreases in correspondence with an error of the drive current from the setting value, as shown in FIG. 6A.

When the drive current is proper, the differential amplifier 16 outputs the output signal S2 indicated by the broken line in FIG. 6A, and the comparison circuit 18 compares this output signal S2 with the triangular wave signal S1 from the triangular wave oscillation circuit 17, thus outputting a pulse signal S3 indicated by a broken line in FIG. 6B. The pulse signal S3 is input to the base terminal of the transistor T7 as a drive signal, and the transistor T7 is driven by the input drive signal, so that it is turned on during a period $T_{ON}$ of the pulse signal S3, and is turned off during a period $T_{OFF}$ of the signal S3. With this drive operation, when the transistor T7 is turned off, a current from the DC power supply V is cut off; when the transistor T7 is turned on, a current is supplied from the DC power supply V to the drive circuit. The supplied current is smoothed to a DC current by the smoothing circuit constituted by the diode D, the coil L3, and the capacitor C, and the smoothed current is supplied to the excitation coil 2b as the drive current.

When the drive current increases due to a factor such as a variation in power supply voltage, the level of the output signal S2 from the differential amplifier 16 decreases below the proper level, as indicated by the solid line in FIG. 6A, and the output signal S3 from the comparison circuit 18 changes in correspondence with the decrease in level, so as to prolong the period $T_{OFF}$ of the pulse signal and to shorten the period $T_{ON}$, as indicated by the solid line in FIG. 6B. More specifically, pulse-width modulation is performed to shorten the period $T_{ON}$ of the pulse signal in correspondence with the decrease in level of the output signal from the differential amplifier 16, i.e., an increase in drive current from the setting value. With this operation, since the ON time of the transistor T7 is shortened, the current supplied from the DC power supply V decreases, and the drive current is controlled to the proper setting value. On the other hand, when the drive current decreases, the level of the output signal from the differential amplifier 16 increases in correspondence with the decrease in drive current, and the output signal from the comparison circuit 18 changes to prolong the period $T_{ON}$ and to shorten the period $T_{OFF}$ accordingly. With this operation, the current supplied from the DC power supply V increases, and the drive current is controlled to the setting value. As described above, since the drive current is detected by the resistor Rd, and the ON time of the transistor T7 is changed on the basis of the detection result, an average current supplied from the DC power supply V is controlled to be constant, and the drive current is maintained to be the setting value.

Figure 1:
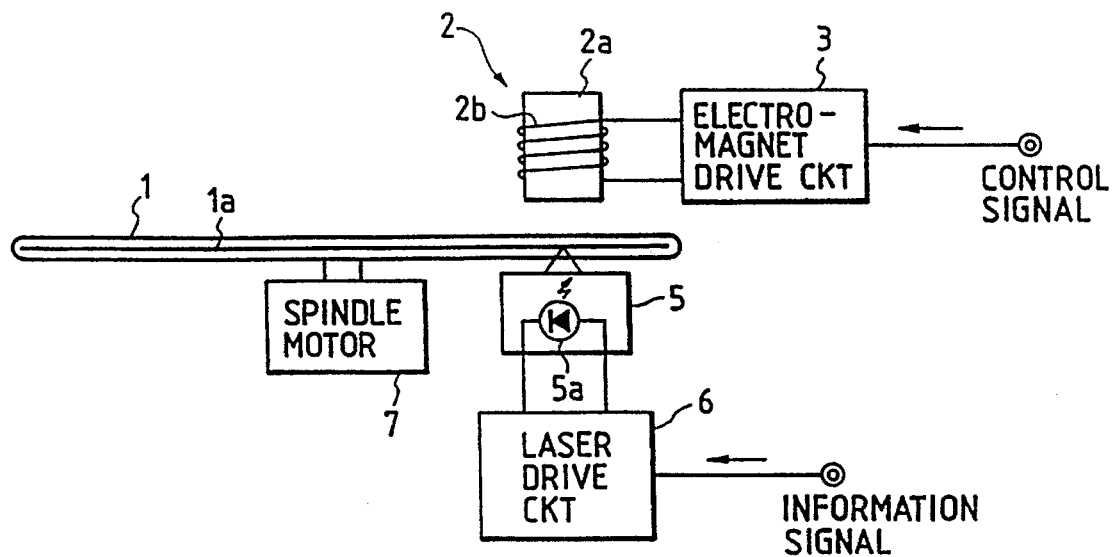
FIG. 1 is a schematic diagram showing the arrangement of a light intensity modulation type magnetooptical recording apparatus.
Figure 2:
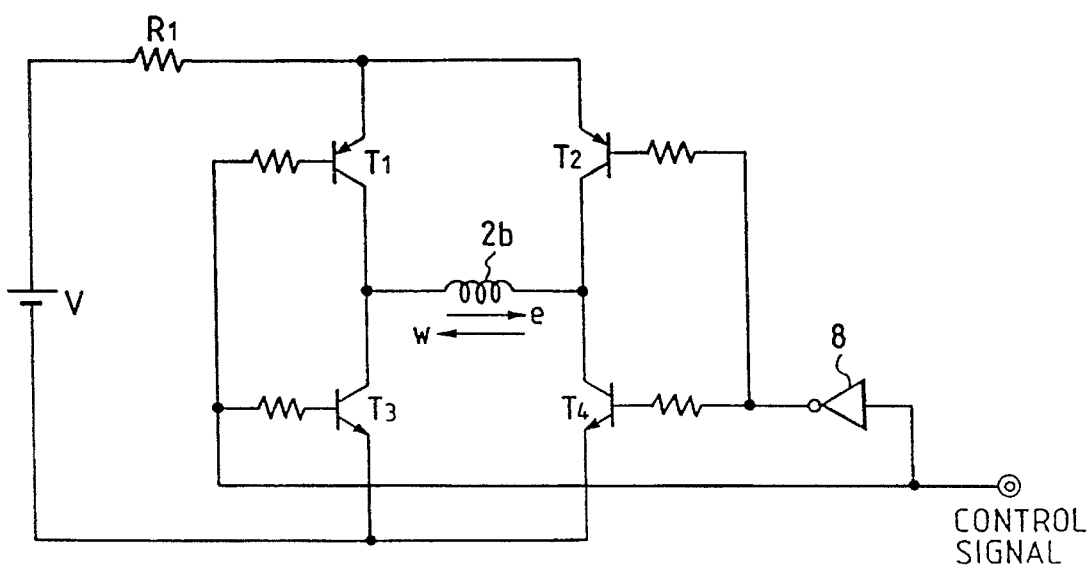
FIG. 2 is a circuit diagram showing an example of an electromagnet drive circuit used in the light intensity modulation type magnetooptical recording apparatus.

In the electromagnet drive circuit, when a low-level control signal is input to instruct the erasing mode of information, the transistors T1 and T4 are turned on, the transistors T2 and T3 are turned off, and an erasing current is supplied to the excitation coil 2b, as described above. Thus, as shown in FIG. 1, an erasing magnetic field is applied from the electromagnet 2 to the magnetooptical disk 1. Also, a laser beam having a predetermined intensity is radiated from the optical head 5 onto the magnetooptical disk 1, and information is erased by radiation of the laser beam and application of the erasing magnetic field. Upon completion of erasing, a high-level control signal is input to instruct the recording mode of information. When information is to be recorded, the transistors T2 and T3 are turned on, the transistors T1 and T4 are turned off, and a current is supplied to the excitation coil 2b in a direction opposite to that in the erasing mode. Thus, the electromagnet 2 applies a recording magnetic field having a polarity opposite to that in the erasing mode to the magnetooptical disk 1. On the other hand, the optical head 5 radiates a laser beam modulated in accordance with a recording signal, and a series of information is recorded by radiation of the modulated laser beam and application of the recording magnetic field.

In this embodiment, a current to be supplied from the DC power supply V to the drive circuit is controlled to be constant by changing the ON time of the transistor T7 constituting the chopper circuit. For example, if the voltage of the DC power supply V is represented by $E_S$, the average current supplied from the DC power supply V is represented by $I_S$, and the voltage and current to be supplied to loads (the transistors T1 to T4 and the excitation coil 2b) via the resistor Rd are respectively represented by $E_L$ and $I_L$, the following relationships are established among these currents and voltages:

$$E_L = E_S \times T_{ON}/(T_{ON}+T_{OFF}) \quad (1)$$

$$I_L = I_S \times (T_{ON}+T_{OFF})/T_{ON} \quad (2)$$

where $T_{ON}$ is the ON time of the transistor T7, and $T_{OFF}$ is the OFF time of the transistor T7. Thus, if the same condition as that adopted in the prior art is assumed, i.e., if the current $I_L$ to be supplied to the excitation coil is 0.4 A, and the sum total of the loads r is 5 Ω, the voltage $E_L$ to be applied to the loads is 2 V ($r \times I_L$). If the voltage $E_S$ of the DC power supply V is 5 V as in the prior art, $T_{ON}/(T_{ON}+T_{OFF})=$ 0.4 from equation (1), and this result yields $I_S=0.16$ A from equation (2).

From the above-mentioned result, electric power $P_S$ ($=E_S \times I_S$) to be supplied from the DC power supply V is 0.8 W, which is equal to electric power $P_L$ ($=E_L \times I_L$) consumed by the loads. More specifically, since electric power which is consumed by the resistor in the conventional circuit is nil, and the DC power supply V need only supply electric power which is consumed by the loads, the electric power to be supplied can be reduced to half or less of that required in the conventional circuit. Therefore, this embodiment can realize remarkably lower power consumption than that in the conventional circuit. Thus, high-density packaging of circuit elements can be realized, and the apparatus can be rendered further compact by such low power consumption and high-density packaging. In this embodiment, since the drive current of the excitation coil can always be controlled to be constant, the magnetic field intensity can be prevented from becoming too low due to a variation in bias magnetic field, and a recording error can be prevented.

Figure 7:
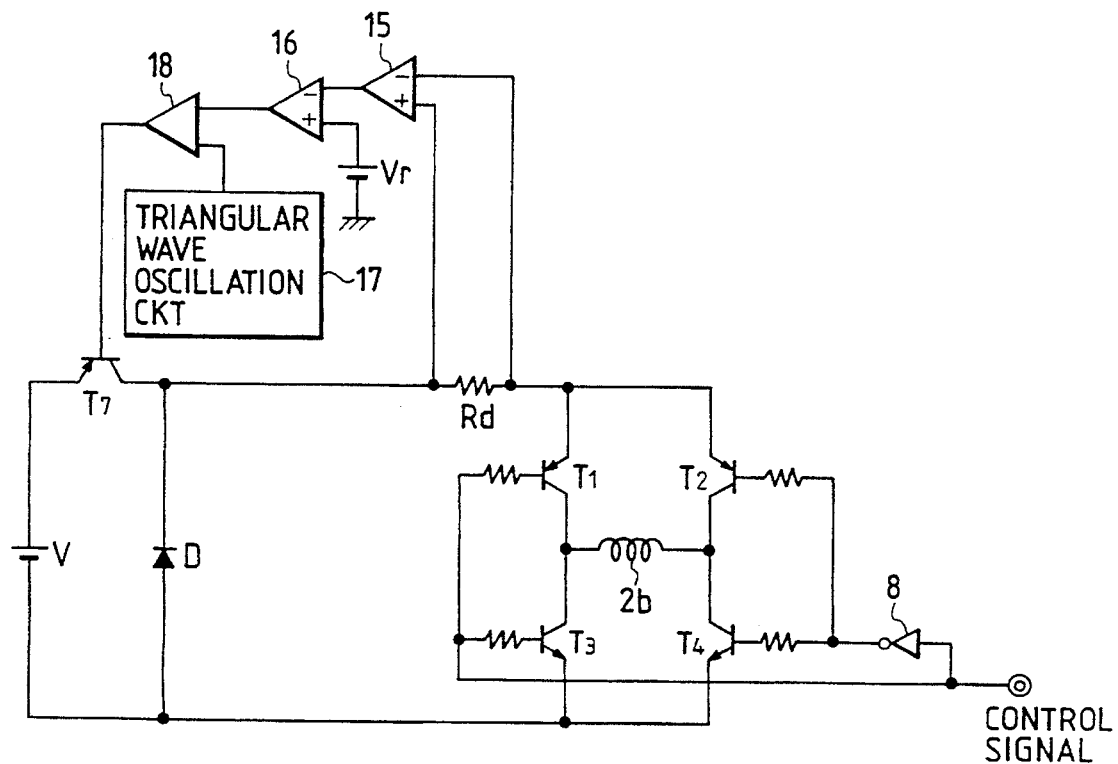
FIG. 7 is a circuit diagram showing the second embodiment of the present invention.

FIG. 7 is a circuit diagram showing the second embodiment of the present invention. In this embodiment, the excitation coil 2b also serves as the coil L3 in FIG. 5. Normally, since an excitation coil of this type has a sufficiently large inductance, the excitation coil 2b is also used as a current smoothing coil by utilizing this feature. Therefore, in this embodiment, since the coil L3 and the capacitor C are omitted, the circuit arrangement can be simplified, the mounting area of circuit elements can be reduced, and cost can also be reduced. In this embodiment, in order to sufficiently eliminate ripple components generated in a drive current of the excitation coil under the influence of switching of the power supply current, the repeating frequency of the triangular wave signal generated by the triangular wave oscillation circuit 17 is preferably set to be a high frequency of 100 kHz or more.

Figure 8:
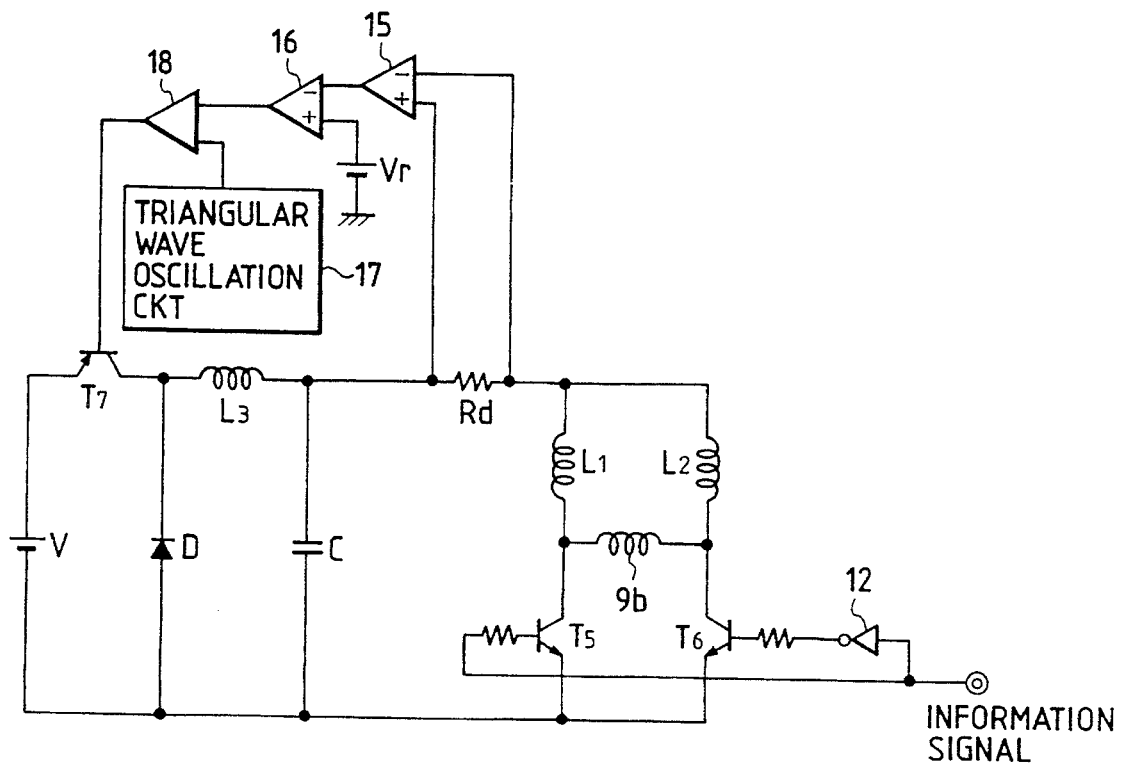
FIG. 8 is a circuit diagram showing the third embodiment of the present invention.

FIG. 8 is a circuit diagram showing the third embodiment of the present invention. In this embodiment, the present invention is applied to a magnetic field modulation type magnetooptical recording apparatus. Since the schematic arrangement of the magnetic field modulation type magnetooptical recording apparatus is the same as that shown in FIG. 3 above, a detailed description thereof will be omitted, and the arrangement of the magnetic head drive circuit 10 will be described in detail below. Note that the same reference numerals in FIG. 8 denote the same parts as in the conventional apparatus shown in FIG. 4, and a detailed description thereof will be omitted. Also, the same reference numerals in FIG. 8 denote the same parts as in the first embodiment. Referring to FIG. 8, the transistor T7 is used for switching the current to be supplied from the DC power supply V to the magnetic head drive circuit as in the embodiment shown in FIG. 5. The switched current is smoothed to a DC current by a smoothing circuit constituted by the coil L3, the diode D, and the capacitor C, and the smoothed current is supplied to the magnetic head drive circuit via the resistor Rd. The voltage across the two terminals of the resistor Rd is detected by the differential amplifier 15, and the differential amplifier 16 detects the difference between the detected voltage and the reference voltage Vr, thus outputting the output signal S2 corresponding to an error of the drive current from the setting value, as shown in FIG. 6A. The comparison circuit 18 compares the output signal S2 with the triangular wave signal S1 from the triangular wave oscillation circuit 17, and outputs a pulse signal, which is pulse-width modulated, as shown in FIG. 6B. When the transistor T7 is switched by this pulse signal, the power supply current is switched, and the switched current is smoothed by the smoothing circuit to be converted into a predetermined DC current.

Figure 3:
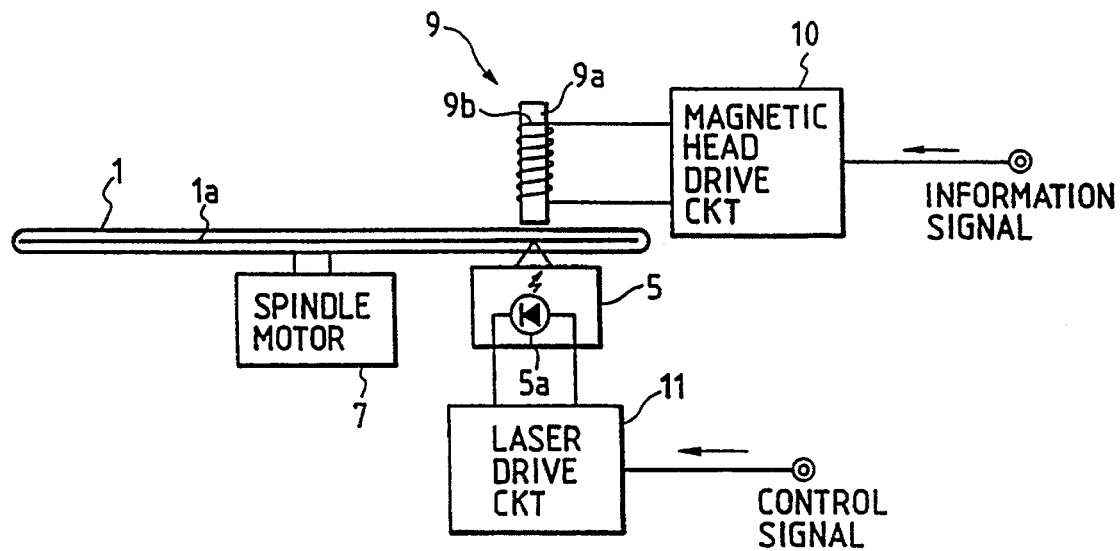
FIG. 3 is a schematic diagram showing the arrangement of a magnetic field modulation type magnetooptical recording apparatus.
Figure 4:
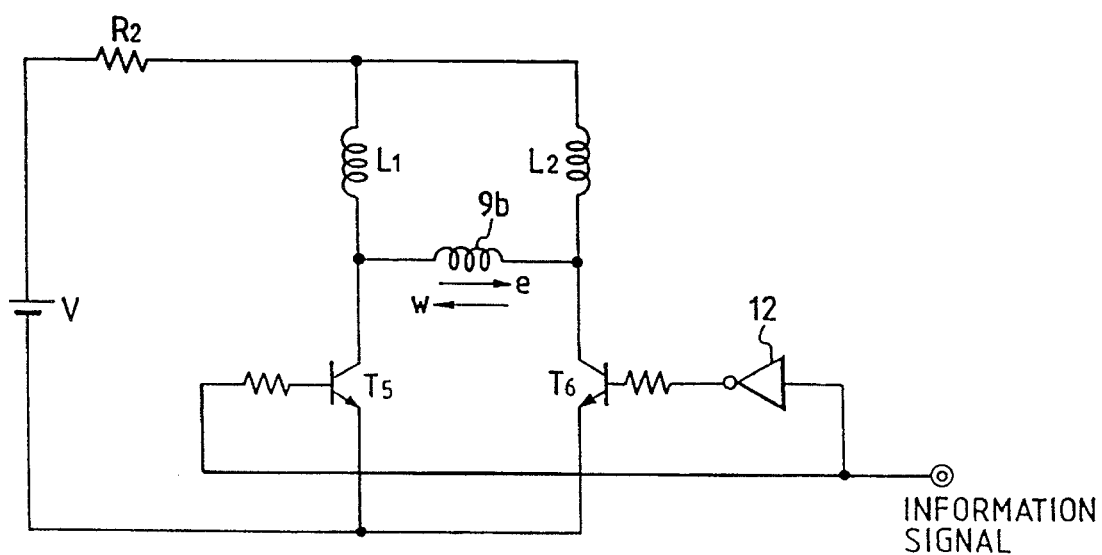
FIG. 4 is a circuit diagram showing an example of a magnetic head drive circuit used in the magnetic field modulation type magnetooptical recording apparatus.

In the magnetic head drive circuit, as described above, the transistors T5 and T6 are turned on/off in accordance with an input information signal, and the direction of the drive current of the excitation coil 9b is switched in correspondence with the information signal. Thus, the magnetic field generated by the magnetic head is modulated to a magnetic field having a positive or negative polarity, and is applied as a recording bias magnetic field onto the magnetooptical disk 1, as shown in FIG. 3. A series of information is recorded on the magnetooptical disk by radiation of a laser beam from the optical head and application of the modulated magnetic field described above.

In this embodiment, electric power consumed by a resistor in the conventional circuit can be saved as in the embodiment shown in FIG. 5, and power consumption of the magnetic head drive circuit can be greatly reduced as compared to the conventional circuit. Since the drive current of the excitation coil can be controlled to be constant independently of a change in temperature, the intensity of the recording bias magnetic field can be prevented from becoming too low, and a recording error caused by a low magnetic field intensity can be prevented.

Figure 9:
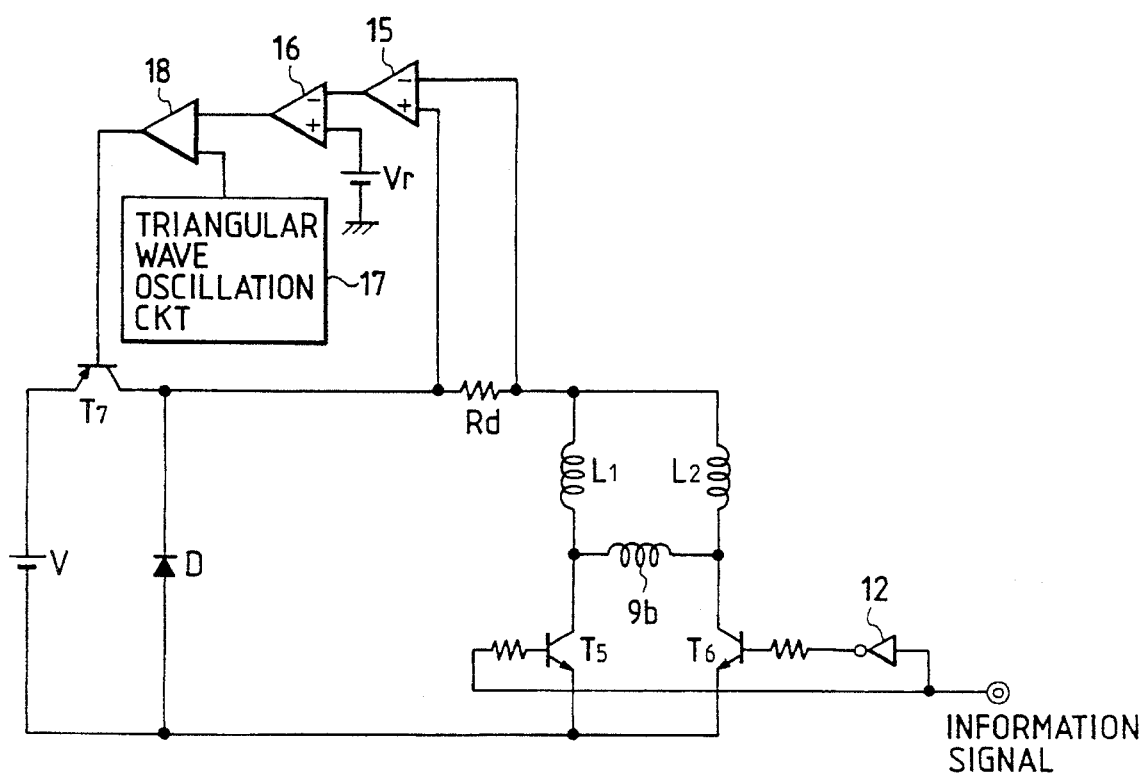
FIG. 9 is a circuit diagram showing the fourth embodiment of the present invention.

FIG. 9 is a circuit diagram showing the fourth embodiment of the present invention. In this embodiment, the auxiliary coils L1 and L2 of the magnetic head drive circuit also serve as the coil L3 in the embodiment shown in FIG. 8. Since the inductances of the auxiliary coils L1 and L2 are sufficiently large, they can be utilized as a current smoothing inductance in place of the coil L3. In this case, in order to sufficiently eliminate ripple components generated in a current to be supplied to the auxiliary coils L1 and L2 under the influence of switching of the power supply current, the repeating frequency of the triangular wave signal generated by the triangular wave oscillation circuit 17 is preferably set to be a high frequency of 100 kHz or more. As described above, according to this embodiment, since the auxiliary coils L1 and L2 are also used as a current smoothing coil, not only the circuit arrangement is simplified as compared to the embodiment shown in FIG. 8, but also the mounting area of circuit elements can be decreased, thus making the apparatus compact, and reducing cost.

In each of the above embodiments, the transistor T7 is pulse-driven at a predetermined frequency, and its ON time is changed, i.e., a current to be supplied to the drive circuit is controlled to be constant by pulse width modulation. However, the present invention is not limited to this. For example, the ON time of the transistor T7 may be set to be constant, and its frequency may be changed, i.e., control may be realized by so-called frequency modulation.

As described above, according to the present invention, the apparatus comprises the transistor T7 for switching the current to be supplied from the DC power supply V to the electromagnet, the smoothing circuit, constituted by the diode D, the coil L3, and the capacitor C, for smoothing the current switched by the transistor T7, and the resistor Rd for detecting the current supplied from the DC power supply V, and the current to be supplied from the DC power supply V to the electromagnet is controlled to be constant by changing the ratio between the ON and OFF times of the transistor T7 in correspondence with an error between the value detected by the resistor Rd and the predetermined reference value Vr.

As described above, according to the present invention, since an average current is controlled to be a predetermined current by switching the current supplied from the DC power supply, power consumption can be greatly reduced as compared to the conventional apparatus, and heat generated in the apparatus is also reduced. For this reason, high-density packaging of circuit elements can be realized accordingly, and the apparatus can be rendered compact. Since a current from the DC power supply can always be controlled to be constant independently of, e.g., a change in temperature, the magnetic field intensity of the electromagnet or the magnetic head can be prevented from lowering, and a recording error caused by a low magnetic field intensity can be prevented.

What is claimed is:

1. A magnetooptical recording apparatus comprising:

an optical head for radiating a light beam onto a magnetooptical recording medium;

bias magnetic field applying means for applying a bias magnetic field to the recording medium;

means for modulating at least one of the light beam and the bias magnetic field in accordance with an information signal;

a DC power supply;

a switch element for switching current supplied from said DC power supply to said bias magnetic field applying means;

a control circuit for controlling driving of said switch element to repeat ON and OFF states at a predetermined frequency;

an inductance element for smoothing the current switched by said switch element; and a current detection element for detecting the current supplied from said DC power supply to said bias magnetic field applying means;

wherein said control circuit drives said switch element such that a time period for an ON state and a time period for an OFF state are varied in accordance with an error between a detection value detected by said current detection element and a predetermined reference value.

2. An apparatus according to claim 1, wherein an excitation coil of an electromagnet of said bias magnetic field applying means also serves as said inductance element.

3. An apparatus according to claim 1, wherein an auxiliary coil provided in said bias magnetic field applying means also serves as said inductance element.

4. A magnetic head drive device comprising:

bias magnetic field applying means for applying a bias magnetic field to a recording medium;

a DC power supply;

a switch element for switching current supplied from said DC power supply to said bias magnetic field applying means;

a control circuit for controlling driving of said switch element to repeat ON and OFF states at a predetermined frequency;

an inductance element for smoothing the current switched by said switch element; and a current detection element for detecting the current supplied from said DC power supply to said bias magnetic field applying means;

wherein said control circuit drives said switch element such that a time period for an ON state and a time period for an OFF state are varied in accordance with an error between a detection value detected by said current detection element and a predetermined reference value.

5. A device according to claim 4, wherein an excitation coil of an electromagnet of said bias magnetic field applying means also serves as said inductance element.

6. A device according to claim 4, wherein an auxiliary coil provided in said bias magnetic field applying means also serves as said inductance element.

7. An apparatus according to claim 1, wherein said control circuit drives said switch element at a repeating frequency of at least 100 kHz.

8. A device according to claim 4, wherein said control circuit drives said switch element at a repeating frequency of at least 100 kHz.

9. A magnetooptical recording apparatus comprising:

an optical head for radiating a light beam to a magnetooptical recording medium;

a bias magnetic field applying means for applying a bias magnetic field to the recording medium;

means for modulating at least one of the light beam and the bias magnetic field in accordance with an information signal;

a DC power supply;

a switch element for switching current supplied from said DC power supply to said bias magnetic field applying means;

a control circuit for controlling driving of said switch element so as to repeat ON and OFF states continuously;

an inductance element for smoothing the current switched by said switch element; and a current detection element for detecting the current supplied from said DC power supply to said bias magnetic field applying means, wherein said control circuit controls a repeating frequency for driving said switch element such that a time period for an ON state and a time period for an OFF state in said switch element are varied in accordance with an error between a detection value detected by said current detection element and a predetermined reference value.

10. An apparatus according to claim 9, wherein an excitation coil of an electromagnet of said bias magnetic field applying means also serves as said inductance element.

11. An apparatus according to claim 9, wherein an auxiliary coil provided in said bias magnetic field applying means also serves as said inductance element.

12. A magnetic head drive device comprising:

a bias magnetic field applying means for applying a bias magnetic field to a recording medium;

a DC power supply;

a switch element for switching current to be supplied from said DC power supply to said bias magnetic field applying means;

a control circuit for controlling driving of said switch element so as to repeat ON and OFF states continuously;

an inductance element for smoothing the current switched by said switch element; and a current detection element for detecting the current supplied from said DC power supply to said bias magnetic field applying means, wherein said control circuit controls a repeating frequency for driving said switch element such that a time period for an ON state and a time period for an OFF state in said switch element are varied in accordance with error between a detection value detected by said current detection element and a predetermined reference value.

13. A device according to claim 12, wherein an excitation coil of an electromagnet of said bias magnetic field applying means also serves as an inductance element.

14. A device according to claim 12, wherein an auxiliary coil provided in said bias magnetic field applying means also serves as said inductance element.

* * * * *